(12) United States Patent
Lin

(10) Patent No.: US 9,385,886 B2
(45) Date of Patent: Jul. 5, 2016

(54) METHOD FOR PROCESSING A PACKET AND RELATED DEVICE

(71) Applicant: Huawei Technologies Co., Ltd., Shenzhen, Guangdong (CN)

(72) Inventor: Chengyong Lin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 106 days.

(21) Appl. No.: 14/147,185

(22) Filed: Jan. 3, 2014

(65) Prior Publication Data

US 2014/0119189 A1 May 1, 2014

Related U.S. Application Data

(63) Continuation of application No. PCT/CN2011/076905, filed on Jul. 6, 2011.

(51) Int. Cl.
*H04L 12/26* (2006.01)
*H04L 12/46* (2006.01)
(Continued)

(52) U.S. Cl.
CPC .......... *H04L 12/4633* (2013.01); *H04L 45/66* (2013.01); *H04L 45/74* (2013.01); *H04L 47/10* (2013.01); *H04L 47/12* (2013.01)

(58) Field of Classification Search
CPC ....... H04L 45/74; H04L 45/745; H04L 45/66; H04L 45/38; H04L 45/08; H04L 45/54; H04L 45/42; H04L 45/021; H04L 45/02; H04L 12/4633; H04L 69/22; H04L 2212/0025; H04L 47/20; H04L 47/2441; H04L 49/15; H04L 2212/00; H04W 28/16; H04W 40/02; H04W 40/24; H04W 48/16; H04W 56/001; H04W 60/00; H04W 76/022; H04W 88/14

USPC .................. 370/392, 395.54, 465
See application file for complete search history.

(56) References Cited

U.S. PATENT DOCUMENTS 7,801,021 B1 9/2010 Triantafillis et al.
8,121,126 B1 * 2/2012 Moisand et al. .............. 370/392
(Continued)

FOREIGN PATENT DOCUMENTS

CN 1466340 A 1/2004
CN 1921457 A 3/2007
(Continued)

OTHER PUBLICATIONS

Bianco et al., "OpenFlow Switching: Data Plane Performance," *IEEE ICC 2010 Proceedings*, IEEE (May 2010).
(Continued)

*Primary Examiner* — Candal Elpenord
*Assistant Examiner* — Ricardo Castaneyra
(74) *Attorney, Agent, or Firm* — Leydig, Voit & Mayer, Ltd.

(57) ABSTRACT

The embodiments of the present invention disclose a method for processing a packet and a related device. One implementation consists of a method for processing a packet that comprises receiving, by a first network device, a forwarded packet, performing a flow table matching for the forwarded packet, and if unmatched, encapsulating the forwarded packet with an inner encapsulation and an outer encapsulation, and transmitting the forwarded packet to a second network device. The method further comprises receiving a flow table packet returned by the second network device, wherein the flow table packet carries flow table information of the forwarded packet and is encapsulated with a special layer 2 frame header, and processing the flow table packet according to an operation indicated by an Ethernet type value in the special layer 2 frame header.

19 Claims, 5 Drawing Sheets

(51) Int. Cl.
*H04L 12/801* (2013.01)
*H04L 12/721* (2013.01)
*H04L 12/741* (2013.01)

(56) References Cited

U.S. PATENT DOCUMENTS

| | | | |
|---|---|---|---|
| 8,615,009 B1* | 12/2013 | Ramamoorthi et al. | 370/389 |
| 8,750,164 B2* | 6/2014 | Casado et al. | 370/254 |
| 2011/0261825 A1 | 10/2011 | Ichino | |
| 2012/0008629 A1* | 1/2012 | Chiba et al. | 370/392 |
| 2012/0023231 A1 | 1/2012 | Ueno | |

FOREIGN PATENT DOCUMENTS

| | | |
|---|---|---|
| CN | 1925386 A | 3/2007 |
| CN | 1929324 A | 3/2007 |
| CN | 1929487 A | 3/2007 |
| CN | 1933438 A | 3/2007 |
| CN | 1933450 A | 3/2007 |
| CN | 1933451 A | 3/2007 |
| CN | 1937431 A | 4/2007 |
| CN | 1946060 A | 4/2007 |
| CN | 1953398 A | 4/2007 |
| CN | 1956415 A | 5/2007 |
| CN | 1968184 A | 5/2007 |
| CN | 1980135 A | 6/2007 |
| CN | 101119306 A | 2/2008 |
| CN | 101252523 A | 8/2008 |
| CN | 101267351 A | 9/2008 |
| CN | 101534218 A | 9/2009 |
| CN | 101834783 A | 9/2010 |
| WO | WO 2010103909 A1 | 9/2010 |
| WO | WO 2011049135 A1 | 4/2011 |

OTHER PUBLICATIONS

"OpenFlow Switch Specification," Version 1.1.0 Implemented (Wire Protocol 0x02) (Feb. 28, 2011).

* cited by examiner

METHOD FOR PROCESSING A PACKET AND RELATED DEVICE

CROSS-REFERENCE TO RELATED APPLICATIONS

This application is a continuation of International Patent Application No. PCT/CN2011/076905, filed on Jul. 6, 2011, which is hereby incorporated by reference in its entirety.

TECHNICAL FIELD

The present invention relates to the field of communication, and particularly, to a method for processing packets and to a related device.

BACKGROUND

Along with the development of the network architecture, various network open technologies appear based on the requirements of the network flattening and the rapid service deployment by the network operator. The packet processing is separated from the network devices, such as a router or switch, and operated in a special control server. Such technologies enable the network to be easier to be planned and managed, and opened based on the current network pattern.

The openflow technology converts a packet forwarding process controlled by a switch or router originally into a technology to be controlled by an openflow switch (or router) and a control server together, thereby achieving the separation of the data forwarding and the routing control. The process is mainly described as follows: the control server establishes a connection with the control layer of the switch (or router) through a Transmission Control Protocol (TCP) or Secure Sockets Layer (SSL); when receiving a data packet, the forwarding layer of the switch (or router) transmits the data packet to a secure channel of the control layer; the secure channel performs the TCP and openflow encapsulation of the packet (for the convenience of description, hereinafter the encapsulated data packet is referred to as an encapsulated packet) and transmits the forwarded packet to the control server; the control server parses the encapsulated packet, converts original data and port information in the encapsulated packet into flow table information and returns the flow table information to the control layer of the switch (or router) by a TCP channel; and then the control layer of the switch (or router) sends the flow table information to the flow table of the switch (or router).

Although the above method can achieve the separation of the data forwarding and the routing control, the openflow establishes the connection based on the TCP/SSL and its performance is completely restricted by the communication capacity between the control layer and the forwarding layer of the switch (or router). However, generally, the communication bandwidth between the control layer and the forwarding layer of the switch (or router) is very small, and it is merely suitable for control layer processing, such as network protocol packets including Open Shortest Path First (OSPF) protocol, Multi-Protocol Label Switching (MPLS) protocol, Border Gateway Protocol (BGP), etc. It is clear that the openflow technology has a performance bottleneck.

SUMMARY

The embodiments of the present invention provide a method for processing packets and a related device, so as to solve the bottleneck restriction of the network device control plane, and achieve the separation of the data forwarding and the routing control.

In order to solve the above technical problem, the embodiments of the present invention provide the following technical solutions:

A method for processing a packet, comprising receiving, by a first network device, a forwarded packet, performing a flow table matching for the forwarded packet, and if unmatched: encapsulating the forwarded packet with an inner encapsulation of an remote tunnel and an outer encapsulation of the remote tunnel, transmitting the forwarded packet to a second network device, so that the second network device forwards the forwarded packet to a control server for processing, receiving a flow table packet returned by the second network device, wherein the flow table packet carries flow table information of the forwarded packet and wherein a special layer 2 frame header is encapsulated in the flow table packet, and processing the flow table packet according to an operation indicated by an Ethernet type value in the special layer 2 frame header.

A method for processing a packet comprising receiving, by a network device, a forwarded packet, performing a flow table matching for the forwarded packet, and if unmatched: encapsulating the forwarded packet with a layer 2 frame header, transmitting the forwarded packet to a control server for processing, receiving a flow table packet returned by the control server, wherein the flow table packet carries flow table information of the forwarded packet and wherein a special layer 2 frame header is encapsulated in the flow table packet, and processing the flow table packet according to an operation indicated by an Ethernet type value in the special layer 2 frame header.

A method for processing a packet, comprising receiving, by a control server, a forwarded packet from a network device, parsing the forwarded packet to generate flow table information of the forwarded packet, generating a flow table packet that carries the flow table information, wherein a special layer 2 frame header is encapsulated in the flow table packet so that the network device processing the flow table packet processes the flow table packet according to an operation indicated by an Ethernet type value in the special layer 2 frame header, and transmitting the flow table packet to the network device.

A network device, comprising a receiving unit, a flow table matching unit, an encapsulating and transmitting unit, and a processing unit, wherein the receiving unit is configured to receive a forwarded packet, wherein the flow table matching unit is configured to perform a flow table matching for the forwarded packet received by the receiving unit, wherein the encapsulating and transmitting unit is configured to, when a matching result of the flow table matching is unmatched, encapsulate the forwarded packet with an inner encapsulation of a remote tunnel and an outer encapsulation of the remote tunnel, and transmit the forwarded packet to a second network device, so that the second network device forwards the forwarded packet to a control server for processing, wherein the receiving unit is further configured to receive a flow table packet returned by the second network device, wherein the flow table packet carries flow table information of the forwarded packet and a special layer 2 frame header is encapsulated in the flow table packet, and wherein the processing unit is configured to process the flow table packet according to an operation indicated by an Ethernet type value in the special layer 2 frame header of the flow table packet.

A network device, comprising a receiving unit, a flow table matching unit, an encapsulating and transmitting unit, a processing unit, wherein the receiving unit is configured to receive a forwarded packet, wherein the flow table matching unit is configured to perform a flow table matching for the forwarded packet, wherein the encapsulating and transmitting unit is configured to, when a matching result of the flow table matching is unmatched, encapsulate the forwarded packet with a layer 2 frame header and to transmit the forwarded packet to a control server for a processing, wherein the receiving unit is further configured to receive a flow table packet returned by the control server, wherein the flow table packet carries flow table information of the forwarded packet and wherein a special layer 2 frame header is encapsulated in the flow table packet, and wherein the processing unit is configured to process the flow table packet according to an operation indicated by an Ethernet type value in the special layer 2 frame header of the flow table packet.

A control server, comprising a receiving unit, a parsing and generating unit, an encapsulating and generating unit, and a transmitting unit, wherein the receiving unit is configured to receive a forwarded packet from a network device, wherein the parsing and generating unit is configured to parse the forwarded packet received by the receiving unit to generate flow table information of the forwarded packet, wherein the encapsulating and generating unit is configured to generate a flow table packet that carries the flow table information, wherein a special layer 2 frame header is encapsulated in the flow table packet, so that the network device processing the flow table packet processes the flow table packet according to an operation indicated by an Ethernet type value in the special layer 2 frame header, and wherein the transmitting unit is configured to transmit the flow table packet generated by the encapsulating and generating unit to the network device.

It is clear that the embodiments of the present invention encapsulate the sent flow table packet with a special layer 2 frame header, so that the network device processing the flow table packet can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the redirection and sending are not restricted by the bottleneck of the network device control plane, and the separation of the data forwarding and the routing control is also achieved.

BRIEF DESCRIPTION OF DRAWINGS

In order to more clearly describe the technical solutions of the embodiments of the present invention or the prior art, the drawings to be used in the descriptions of the embodiments or the prior art are briefly introduced as follows. Obviously, the following drawings only illustrate some embodiments of the present invention, and a person skilled in the art can obtain other drawings from these drawings without paying a creative effort.

DESCRIPTION OF EMBODIMENTS

The embodiments of the present invention provide a method for processing a packet and a related device.

In order that the objects, features and advantages of the present invention are more apparent and understandable, the technical solutions of the embodiments of the present invention will be clearly and completely described as follows with reference to the drawings. The described embodiments are only a subset of all embodiments of the present invention. Based on the embodiments of the present invention, any other embodiment obtained by a person skilled in the art without paying a creative effort shall fall within the protection scope of the present invention.

Figure 1:
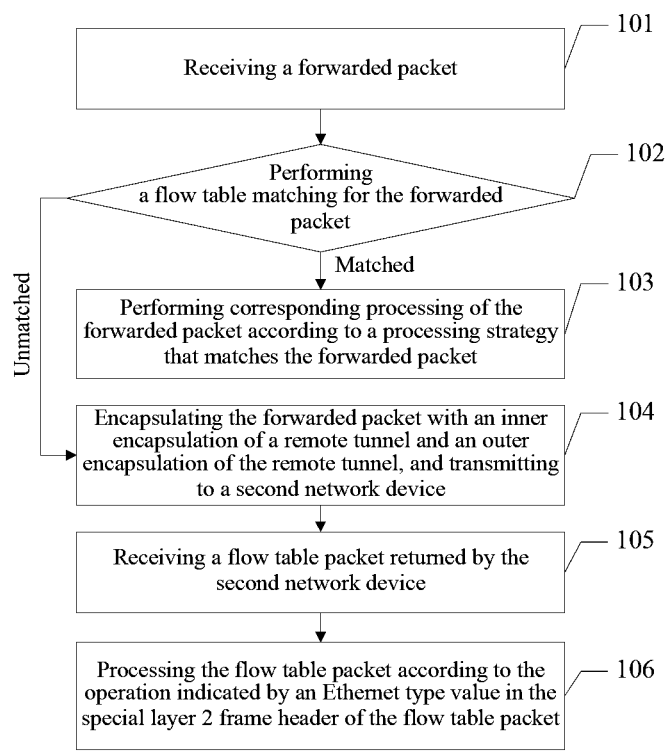
FIG. 1 is a flowchart of a method for processing a packet according to an embodiment of the present invention.

Next, a method for processing a packet according to an embodiment of the present invention is described as follows by taking a first network device as the description subject. Referring to FIG. 1, the method for processing a packet according to the embodiment of the present invention includes:

101: a first network device receives a forwarded packet.

102: the first network device performs a flow table matching for the forwarded packet.

After receiving the forwarded packet, the first network device firstly performs a flow table matching (e.g., quintuple matching) for the forwarded packet to determine whether there is a local processing strategy that matches the forwarded packet. If yes, the first network device performs step 103. Otherwise it performs step 104.

103: the first network device performs corresponding processing of the forwarded packet according to the processing strategy that matches the forwarded packet.

104: the first network device encapsulates the forwarded packet with an inner encapsulation of a remote tunnel and an outer encapsulation of the remote tunnel, and transmits the forwarded packet to a second network device.

To be noted, the first network device in the embodiment of the present invention may be a network device deployed at the core layer or the convergence layer, or a network device deployed at the distal end of the control server, and it is separated from the control server by a plurality of network devices (e.g., the second network device). Thus, the first network device needs to transmit the forwarded packet to the control server through other network devices.

In practical applications, a remote data channel (e.g., the Pseudo Wire (PW) tunnel) may be established between the first and second network devices by configuring the first and second network devices through the command lines, respectively. The first network device transmits the forwarded packet to the second network device through the established remote data channel, and the second network device forwards the forwarded packet to the control server. After processing the forwarded packet, the control server needs to return the processed forwarded packet (i.e., the flow table packet) to the first network device through the second network device. Since one control server may manage a plurality of network devices (e.g., the first network device) having the function of flow table processing, the second network device may carry the identification of the first network device in the forwarded packet before forwarding the forwarded packet to the control server, so as to ensure that the control server can return the processed forwarded packet to the first network device.

In order to ensure that the forwarded packet can be transmitted to the second network device through the remote data channel, the first network device encapsulates the received forwarded packet with the inner encapsulation of the remote tunnel and the outer encapsulation of the remote tunnel. Specifically, the inner encapsulation of the remote tunnel may be an MPLS label, and the outer encapsulation of the remote tunnel may be an MPLS label, a Generic Routing Encapsulation (GRE) encapsulation or an Internet Protocol Security Protocol (IPSec) encapsulation.

The first network device may also carry Packet Control Info (PCI) in the forwarded packet, wherein the PCI describes the basic attributes of the forwarded packet, such as the source of the forwarded packet (e.g., an uplink packet or a downlink loop-back packet), the type of the forwarded packet (e.g., an http-get packet or a UDP packet), the reporting mode of the forwarded packet (e.g., a duplicated packet, or a packet redirected to the control server), the physical port number of the first network device, etc., so that the control server can acquire more information related to the forwarded packet after receiving the forwarded packet, thereby making more accurate judgment and processing to the forwarded packet.

105: a flow table packet returned by the second network device is received.

In practical applications, after receiving the forwarded packet, the control server parses the forwarded packet and generates the flow table information thereof, wherein the flow table information may specifically include the entries as shown in Table 1.

TABLE 1

| Flow Table Attribute | Quintuple | Statistics | Bandwidth Management | Action | Reserve |
| --- | --- | --- | --- | --- | --- |

In which, the flow table attribute indicates whether the flow table is static or dynamic, including marks v4 and v6; the quintuple includes source IP address, destination IP address, source port number, destination port number and protocol number; the statistical ID may be made based on user or protocol type; the bandwidth management may be performed based on user or protocol type, could be divided into uplink and downlink; and the action represents action processing to the matched stream, including uplink and downlink, and the action includes dropping, redirection, forwarding, duplication, etc.

In practical applications, the control server generates the flow table information of the forwarded packet, according to the content of the forwarded packet and the service processing the forwarded packet. For example, when a control service of flow filtration performs a dropping control of an illegal access request, the control server configures a dropping action among the actions of the generated flow table information in case an access by the forwarded packet is illegal (it may be judged whether the access by the forwarded packet is illegal according to the destination IP address, i.e., the access address, in the forwarded packet).

The control server sends a flow table packet carrying the flow table information to the first network device through the second network device, and a special layer 2 frame header is encapsulated in the flow table packet wherein an Ethernet type value in the special layer 2 frame header may instruct the first network device to operate on the flow table packet.

Under an application scenario, when one control server manages a plurality of network devices (e.g., first network device) having the function of flow table processing, the control server may carry the identification of the first network device in the flow table packet, so as to ensure that the control server can return the flow table packet to the first network device through the second network device.

106: the flow table packet is processed according to the operation indicated by the Ethernet type value in the special layer 2 frame header.

The forwarding layer of the first network device may parse out information in the special layer 2 frame header of the flow table packet by performing a layer 2 packet parsing for the flow table packet, and process the flow table packet according to the operation indicated by the Ethernet type value in the special layer 2 frame header, e.g., directly looping back the flow table packet, transparent transferring the flow table packet, or generating a flow table according to the flow table packet.

In practical applications, the Ethernet type value in the special layer 2 frame header may be determined by the control server according to the content of service data carried by the forwarded packet and an execution strategy that is locally preset and corresponding to the service. For example, assuming that the content of service data carried by the forwarded packet belongs to the Parental Control service, for which the control server judges whether the forwarded packet accesses an illegal website (it may be determined according to the destination IP address in the forwarded packet) when receiving the forwarded packet. If yes, the control server may construct an http packet that includes a legitimate website, encapsulate it into the flow table packet, and set the Ethernet type value in the special layer 2 frame header as a value that indicates an action of transparent transmission. After receiving the flow table packet, the first network device transparent transfers the flow table packet to the user directly. If the forwarded packet accesses a legal website, the control server may set the Ethernet type value in the special layer 2 frame header as a value that indicates an action of loop-back; and after receiving the flow table packet, the first network device loops back the flow table packet to the uplink query routing, so as to forward it to the destination website.

The first network device may be a router, switch or other network device having the function of flow table processing. The second network device may be a router or switch. The control server may be a Scalable Service Platform (SSP) server.

It is clear that the embodiment of the present invention encapsulates the sent flow table packet with a special layer 2 frame header, so that the first network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the bottleneck of the network device control plane is not restrictive, and the separation of the data forwarding and the routing control is also achieved.

Figure 2:
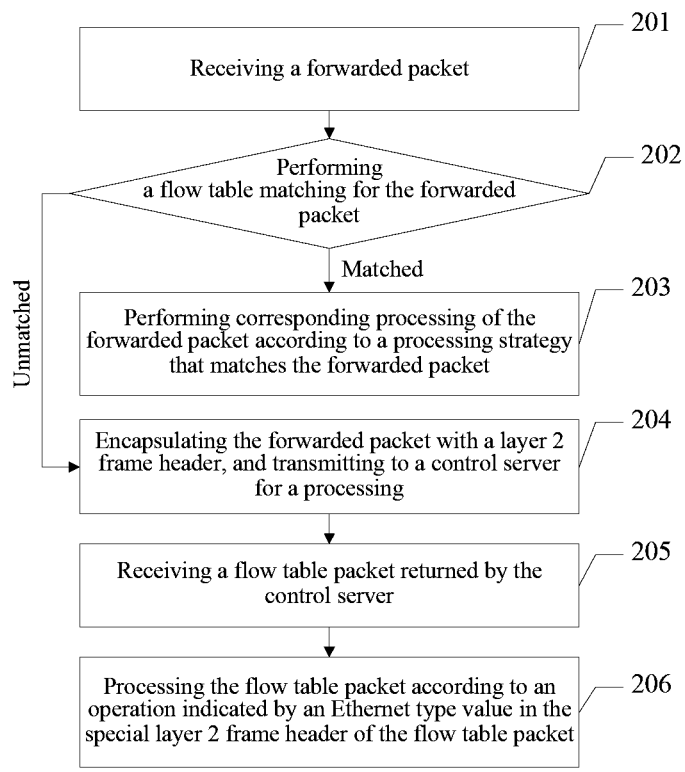
FIG. 2 is a flowchart of a method for processing a packet according to another embodiment of the present invention.

The above embodiment describes a situation where the network device having the function of flow table processing is deployed on the core layer, the convergence layer, or the far end of the control server. Next, a method for processing a packet according to an embodiment of the present invention is described with respect to the situation where the network device is deployed on the access network or the near end of the control server. Referring to FIG. 2, the method includes:

201: a network device receives a forwarded packet.

202: the network device performs a flow table matching for the forwarded packet.

After receiving the forwarded packet, the network device firstly performs a flow table matching (e.g., quintuple matching) for the forwarded packet to determine whether there is a local processing strategy that matches the forwarded packet; and if yes, the network device performs step 203; otherwise it performs step 204.

203: the network device performs corresponding processing of the forwarded packet according to the processing strategy that matches the forwarded packet.

204: the network device encapsulates the forwarded packet with a layer 2 frame header, and transmits the forwarded packet to the control server for a processing.

Since the network device is a network device of the access layer and it is closer to the control server, the forwarded packet may be transmitted to the control server for a processing directly, by using the layer 2 network. The network device may encapsulate the forwarded packet with the layer 2 frame header and directly transmit it to the control server.

205: a flow table packet returned by the control server is received.

In practical applications, the control server parses the forwarded packet after receiving it and generates flow table information thereof, which may specifically include the entries as shown in Table 1.

In practical applications, the control server generates the flow table information of the forwarded packet according to the content thereof and the service processing the forwarded packet. For example, when the flow filtration control service performs a discarding control of an illegal access request, the control server configures a discarding action among the actions of the generated flow table information in case an access by the forwarded packet is illegal (it may be judged whether the access by the forwarded packet is illegal according to the destination IP address, i.e., the access address, in the forwarded packet).

The control server sends a flow table packet carrying the flow table information to the network device, and a special layer 2 frame header is encapsulated in the flow table packet wherein an Ethernet type value in the special layer 2 frame header may instruct the network device to operate on the flow table packet.

Under an application scenario, when one control server manages a plurality of network devices (e.g., first network device) having the function of flow table processing, the control server may carry the identification of the first network device in the flow table packet, so as to ensure that the control server can return the flow table packet to the network device.

206: the flow table packet is processed according to the operation indicated by the Ethernet type value in the special layer 2 frame header.

The forwarding layer of the network device may parse out information in the special layer 2 frame header of the flow table packet by performing a layer 2 packet parsing for the flow table packet, and process the flow table packet according to the operation indicated by the Ethernet type value in the special layer 2 frame header, e.g., directly looping back the flow table packet, transparent transferring the flow table packet, or generating a flow table according to the flow table packet.

In practical applications, the Ethernet type value in the special layer 2 frame header may be determined by the control server according to the content of service data carried by the forwarded packet and an execution strategy that is locally preset and corresponding to the service. For example, assuming that the content of service data carried by the forwarded packet belongs to the Parental Control service, for which the control server judges whether the forwarded packet accesses an illegal website (it may be determined according to the destination IP address in the forwarded packet) when receiving the forwarded packet. If yes, the control server may construct an http packet that includes a legal website, encapsulate it into the flow table packet, and set the Ethernet type value in the special layer 2 frame header as a value that indicates an action of transparent transmission. After receiving the flow table packet, the network device transparent transfers the flow table packet to the user directly. If the forwarded packet accesses a legal website, the control server may set the Ethernet type value in the special layer 2 frame header as a value that indicates an action of loop-back; and after receiving the flow table packet, the network device loops back the flow table packet to the uplink query routing, so as to forward it to the destination website.

The network device may be a router, switch or other network device having the function of flow table processing. The control server may be an SSP server.

It is clear that the embodiment of the present invention encapsulates the sent flow table packet with a special layer 2 frame header, so that the network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the redirection and the sending are not restricted by the bottleneck of the network device control plane, and the separation of the data forwarding and the routing control is also achieved.

Figure 3:
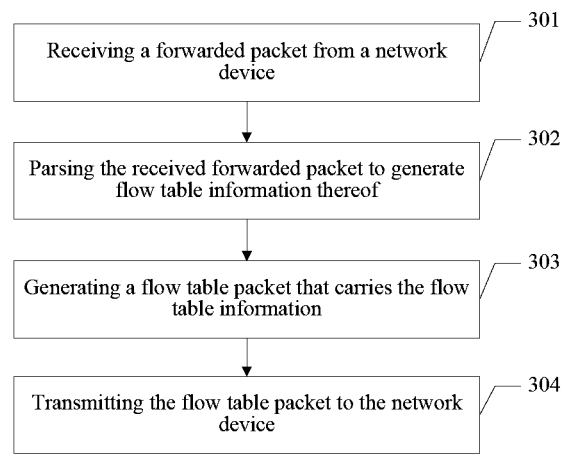
FIG. 3 is a flowchart of a method for processing a packet according to still another embodiment of the present invention.

Next, a method for processing a packet according to an embodiment of the present invention is described by taking a control server as the description subject. Referring to FIG. 3, the method includes:

301: a control server receives a forwarded packet from a network device.

302: the received forwarded packet is parsed to generate flow table information thereof.

The control server may parse the forwarded packet after receiving it to generate flow table information thereof, which may include the entries as shown in Table 1.

303: a flow table packet that carries the flow table information is generated.

The control server encapsulates the flow table information generated in step 302 to generate the flow table packet.

In order that the network device may directly process the flow table packet on the forwarding layer after receiving it, a special layer 2 frame header is encapsulated in the flow table packet by the control server wherein an Ethernet type value in the special layer 2 frame header instructs the network device to process the flow table packet. In practical applications, the Ethernet type value in the special layer 2 frame header may be determined by the control server according to the content of service data carried by the forwarded packet and an execution strategy that is locally preset and corresponding to the service. For example, assuming that the content of service data carried by the forwarded packet belongs to the Parental Control service, for which the control server judges whether the forwarded packet accesses an illegal website (it may be determined according to the destination IP address in the forwarded packet) when receiving the forwarded packet. If yes, the control server may construct an http packet that includes a legitimate website, encapsulate it into the flow table packet, and set the Ethernet type value in the special layer 2 frame header as a value that indicates an action of transparent transmission; and after receiving the flow table packet, the network device transparent transfers the flow table packet to the user directly. If the forwarded packet accesses a legal website, the control server may set the Ethernet type value in the special layer 2 frame header as a value that indicates an action of loop-back; and after receiving the flow table packet, the network device loops back the flow table packet to the uplink query routing, so as to forward it to the destination website.

It will be appreciated that since the Ethernet type value in the special layer 2 frame header is a user-defined parameter value, the control server needs to encapsulate the flow table packet with an ordinary layer 2 frame header after encapsulating it with a special layer 2 frame header, so as to ensure a normal transmission of the flow table packet in the layer 2 network.

Further, when one control server manages a plurality of network devices, the control server may carry the identification of the network device in the flow table packet (e.g., in the ordinary layer 2 frame header).

304: the flow table packet is transmitted to the network device.

If the network device is directly connected to the control server through the layer 2 network, the control server can directly return the flow table packet to the network device through the layer 2 network.

If the network device is deployed at the core network, the convergence network or the distal end of the control server, the control server may send the flow table packet to the near end network device (a network device having the forwarding function, such as the second network device) that forwards the flow table packet to the network device.

The control server may be an SSP server.

It is clear that in the embodiment of the present invention, the control server encapsulates the sent flow table packet with a special layer 2 frame header, so that the network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the redirection and the sending are not restricted by the bottleneck of the network device control plane, and the separation of the data forwarding and the routing control is also achieved.

Next, a method for processing a packet under a specific application scenario according to an embodiment of the present invention will be described by taking a first network device, a second network device and a control server as the description subjects.

Figure 4:
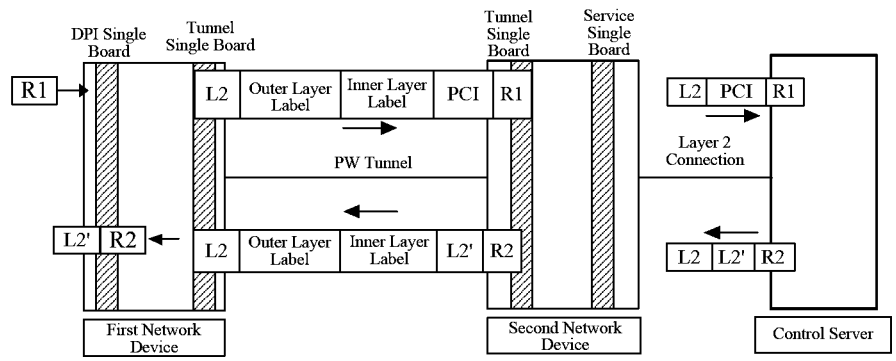
FIG. 4 is a diagram of a forwarded packet transmission in the whole processing flow based on a method for processing a packet provided by the present invention.
Figure 5:
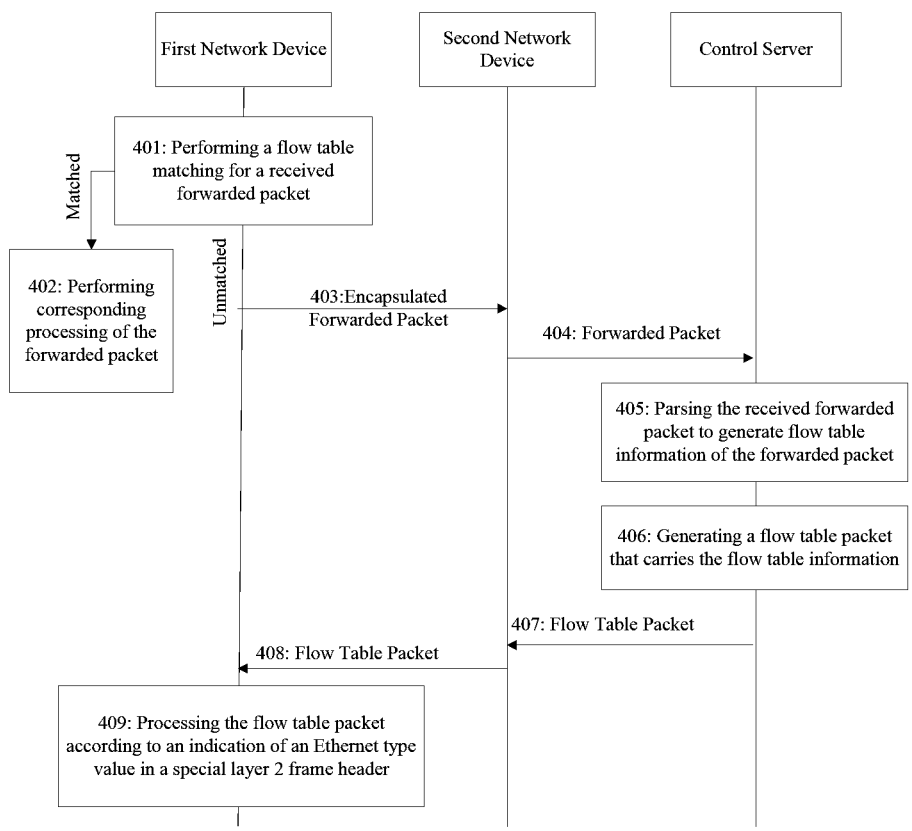
FIG. 5 is a flowchart of a method for processing a packet under an application scenario according to yet another embodiment of the present invention.

Firstly, referring to FIG. 4, which is a diagram of a forwarded packet transmission in the whole processing flow, wherein R1 represents the forwarded packet received by the first network device, L2 represents the encapsulated ordinary layer 2 frame header, L2' represents the encapsulated special layer 2 frame header, and R2 represents the flow table information of the forwarded packet generated by the control server. Specifically, as illustrated in FIG. 5, the packet processing flow includes:

401: a first network device receives a forwarded packet, and performs a flow table matching for the received forwarded packet.

The first network device performs a flow table matching (e.g., quintuple matching) for the forwarded packet after receiving it to determine whether there is a local processing strategy that matches the forwarded packet; and if yes, the first network device performs step 402; otherwise, it performs step 403.

402: the first network device performs corresponding processing of the forwarded packet according to the processing strategy that matches the forwarded packet.

403: the first network device encapsulates the forwarded packet, and transmits the forwarded packet to a second network device.

In practical applications, a PW tunnel may be established between the first network device and second network device. The first network device transmits the encapsulated forwarded packet to the second network device through the PW tunnel, and the PW tunnel may be established by multiplexing the static PW flow. Specifically, assuming that the IP address of the first network device is 192.2.2.2, and the IP address of the second network device is 192.1.1.1, then the PW tunnel may be established by performing the following configurations in the first network device and the second network device, respectively.

The following command line configuration is performed in the first network device:

mpls static-l2vc destination 192.1.1.1 transmit-vpn-label 200 receive-vpn-label 100 DPI_DPI.

The following command line configuration is performed in the second network device:

mpls static-l2vc destination 192.2.2.2 transmit-vpn-label 100 receive-vpn-label 200 ip-interworking.

Assuming that the above command line configurations are performed in the first network device and the second network device, and the sending of the forwarded packet is realized by a DPI single board and a Network Processor (NP) in the first network device, then firstly, the internal resources of the first network device may apply for a label (M1 label for short) sent to the DPI single board, and establish two forwarding entries in the NP, i.e., an insegment table and an outsegment table. In the insegment table, the action is equal to label switching, an inner encapsulation of an remote tunnel is equal to transmit-vpn-label, destination board and destination port (TB/TP for short) is equal to ingress board TB/TP of an LSP tunnel, and ousegment table index value is equal to outsegment table index value corresponding to the LSP tunnel. The ousegment table includes information of an outer encapsulation of the remote tunnel in an encapsulation mode of MPLS encapsulation. The information of the outer encapsulation of the remote tunnel in the outsegment table, the ingress board TB/TP of the LSP tunnel in the insegment table and the outsegment table index value corresponding to the LSP tunnel may be acquired by means of the IP address of the second network device (assuming that the LSP tunnel has been established between the first network device and the second network device).

If the forwarded packet is unmatched in step 401, the DPI single board marks the forwarded packet with M1 label and corresponding PCI information to encapsulate it into an MPLS packet and transmit to the NP. When finding that the forwarded packet has the M1 label through a parsing, the NP queries the insegment table to obtain TB/TP, actions, information of the inner encapsulation of the remote tunnel and ousegment table index value; acquires information of the outer encapsulation of the remote tunnel by means of the acquired ousegment table index value; and performs a label switching, i.e., flicking off the original MPLS label, encapsulating the forwarded packet with the inner encapsulation of the remote tunnel and the outer encapsulation of the remote tunnel, respectively, according to the acquired information of the inner encapsulation of the remote tunnel and the information of the outer encapsulation of the remote tunnel, encapsulating the forwarded packet with a layer 2 frame header (ordinary layer 2 frame header), and transmitting it through the PW tunnel, thereby completing the process of transmitting the forwarded packet.

404: the second network device forwards the received forwarded packet to the control server.

After receiving the forwarded packet, the second network device removes the inner encapsulation of the remote tunnel and the outer encapsulation of the remote tunnel which are encapsulated on the forwarded packet, then re-encapsulates the forwarded packet with a layer 2 frame header and transmits the forwarded packet to the control server.

As a near end device of the control server, the second network device can directly use the layer 2 connection with the control server to transmit the forwarded packet to the control server.

Specifically, the following command line configuration of step 403 may be performed in the second network device in advance: mpls static-l2vc destination 192.2.2.2 transmit-vpn-label 100 receive-vpn-label 200 ip-interworking, wherein ip-interworking indicates an attribute of different transmission media. After receiving the forwarded packet, the second network device removes the inner encapsulation of the remote tunnel and the outer encapsulation of the remote tunnel which are encapsulated on the forwarded packet. Due to the different media transmission, the second network device searches for an address resolution protocol (arp) table, and re-encapsulates the forwarded packet with a layer 2 frame header, and may further carry the identification (e.g., router id) of the first network device in the layer 2 frame header, and transmits the forwarded packet to the control server from an egress interface.

405: the control server parses the received forwarded packet to generate flow table information of the forwarded packet.

The control server parses the forwarded packet after receiving the forwarded packet to generate flow table information of the forwarded packet, which may include entries as shown in Table 1.

406: The control server generates a flow table packet that carries the flow table information.

The control server encapsulates the flow table information generated in step 405 to generate the flow table packet.

In order that the network device directly processes the flow table packet on the forwarding layer after the network device receiving the flow table packet, a special layer 2 frame header is encapsulated in flow table packet by the control server wherein an Ethernet type value in the special layer 2 frame header instructs the network device to process the flow table packet. In practical applications, the Ethernet type value in the special layer 2 frame header may be determined by the control server according to the content of service data carried by the forwarded packet and an execution strategy that is locally preset and corresponding to the service. For example, assuming that the content of service data carried by the forwarded packet belongs to a parental control service, for which the control server determines whether the forwarded packet accesses an illegal website (it may be determined according to the destination IP address in the forwarded packet) when receiving the forwarded packet. If yes, the control server may construct an http packet that includes a legal website, encapsulate it into the flow table packet, and set the Ethernet type value in the special layer 2 frame header as a value that indicates an action of transparent transmission. After receiving the flow table packet, the network device transparent transfers the flow table packet to the user directly. If the forwarded packet accesses a legal website, the control server may set the Ethernet type value in the special layer 2 frame header as a value that indicates an action of loop-back; after receiving the flow table packet, the network device loops back the flow table packet to the uplink query routing, so as to forward it to the destination website.

It will be appreciated that since the Ethernet type value in the special layer 2 frame header is a user-defined parameter value, the control server needs to encapsulate the flow table packet with an ordinary layer 2 frame header after encapsulating it with a special layer 2 frame header, so as to ensure a normal transmission of the flow table packet in the layer 2 network.

Further, when one control server manages a plurality of network devices, the control server may carry the identification of the network device in the flow table packet (e.g., in the ordinary layer 2 frame header).

407: the control server transmits the flow table packet to the second network device.

408: the second network device forwards the received flow table packet to the first network device.

The second network device may return the flow table packet after receiving it to the first network device through the PW tunnel established in step 403. Firstly, the second network device removes a ordinary layer 2 frame header which is encapsulated on the flow table packet, encapsulates the flow table packet with the inner encapsulation of the remote tunnel, the outer encapsulation of the remote tunnel and the layer 2 frame header by querying the local insegment table and outsegment table, and then transmits it to the first network device.

409: the first network device processes the flow table packet according to the indication of the Ethernet type value in the special layer 2 frame header.

After receiving the flow table packet returned by the second network device, the first network device removes the ordinary layer 2 frame header, the inner encapsulation of the remote tunnel and the outer encapsulation of the remote tunnel which are encapsulated on the flow table packet, checks the special layer 2 frame header, and processes the flow table packet according to the operation indicated by the Ethernet type value in the special layer 2 frame header, e.g., directly looping back the flow table packet, transparent transferring the flow table packet, or generating a flow table according to the flow table packet.

It is clear that the embodiment of the present invention a special layer 2 frame header is encapsulated in the sent flow table packet, so that the first network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the redirection and the sending are not restricted by the bottleneck of the network device control plane, and the separation of the data forwarding and the routing control is also achieved.

Figure 6:
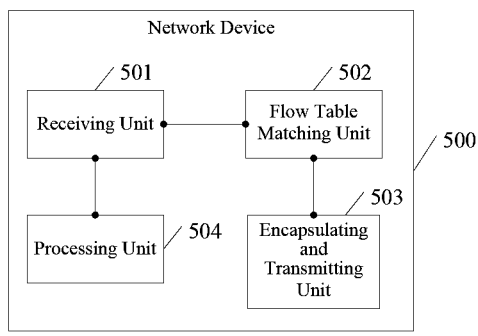
FIG. 6 is a structural diagram of a network device according to an embodiment of the present invention.

Next, a network device according to an embodiment of the present invention will be described. Referring to FIG. 6, a network device 500 according to an embodiment of the present invention includes:

a receiving unit 501, a flow table matching unit 502, an encapsulating and transmitting unit 503 and a processing unit 504, The receiving unit 501 is configured to receive a forwarded packet.

The flow table matching unit 502 is configured to perform a flow table matching for the forwarded packet received by the receiving unit 501.

The flow table matching unit 502 performs a flow table matching (e.g., quintuple matching) for the forwarded packet to determine whether there is a local processing strategy that matches the forwarded packet; and if not, the encapsulating and transmitting unit 503 is triggered.

The encapsulating and transmitting unit 503 is configured to encapsulate the received forwarded packet with an inner encapsulation of a remote tunnel and an outer encapsulation of the remote tunnel, and transmit to a second network device so that the second network device forwards the forwarded packet to the control server for a processing, when the matching result of the flow table matching unit 502 is "unmatched".

In practical applications, a remote data channel (e.g., the Pseudo Wire (PW) tunnel) may be established between the network device 500 and the second network device by configuring the network device 500 and the second network device through the command lines, respectively. The network device 500 transmits the forwarded packet to the second network device through the established remote data channel, and the second network device forwards the forwarded packet to the control server.

In order to ensure that the forwarded packet can be transmitted to the second network device through the remote data channel, the encapsulating and transmitting unit 503 encapsulates the received forwarded packet with the inner encapsulation of the remote tunnel and the outer encapsulation of the remote tunnel. Specifically, the inner encapsulation of the remote tunnel may be an MPLS label, and the outer encapsulation of the remote tunnel may be an MPLS label, a GRE encapsulation or an IPSec encapsulation.

The encapsulating and transmitting unit 503 may also carry PCI information in the forwarded packet, wherein the PCI information describes the basic attributes of the forwarded packet, such as the source of the forwarded packet (e.g., an uplink packet or a downlink loop-back packet), the type of the forwarded packet (e.g., an http-get packet or a UDP packet), the reporting mode of the forwarded packet (e.g., a duplicated packet, or a packet redirected to the control server), the physical port number of the network device 500, etc., so that the control server can acquire more information related to the forwarded packet after receiving the forwarded packet, thereby making more accurate judgment and processing to the forwarded packet.

Further, the receiving unit 501 is also configured to receive a flow table packet returned by the second network device, wherein the flow table packet carries the flow table information of the forwarded packet and is encapsulated with a special layer 2 frame header. In which, the flow table information may be as shown in Table 1, and the Ethernet type value in the special layer 2 frame header may instruct the processing unit 504 to operate on the flow table packet.

The processing unit 504 is configured to process the flow table packet according to the operation indicated by the Ethernet type value in the special layer 2 frame header of the flow table packet received by the receiving unit 501.

The processing unit 504 may parse out information in the special layer 2 frame header of the flow table packet by performing a layer 2 packet parsing for the flow table packet, and process the flow table packet according to the operation indicated by the Ethernet type value in the special layer 2 frame header, e.g., directly looping back the flow table packet, transparent transferring the flow table packet, or generating a flow table according to the flow table packet.

The network device 500 may be deployed at the core layer, the convergence layer, or the distal end of the control server, and may be a router, switch or other network device having the function of flow table processing, herein is not limited.

It is clear that in the embodiment of the present invention, the control server encapsulates the sent flow table packet with a special layer 2 frame header, so that the network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the bottleneck of the network device control plane is not restrictive, and the separation of the data forwarding and the routing control is achieved.

To be noted, the network device 500 herein may be the first network device as described in the above method embodiments, and may be employed to implement all the technical solutions of the above method embodiments. The functions of respective functional modules of the network device 500 may be specifically achieved according to the methods in the above method embodiments. For the detailed processes, please refer to related descriptions of the above embodiments, and herein are not repeated.

Next, another network device according to an embodiment of the present invention will be described, and the network device includes: a receiving unit, a flow table matching unit, an encapsulating and transmitting unit, and a processing unit.

The receiving unit is configured to receive a forwarded packet.

The flow table matching unit is configured to perform a flow table matching for the forwarded packet received by the receiving unit.

The flow table matching unit performs a flow table matching (e.g., quintuple matching) for the forwarded packet to determine whether there is a local processing strategy that matches the forwarded packet; and if not, the encapsulating and transmitting unit is triggered.

The encapsulating and transmitting unit is configured to encapsulate the forwarded packet with a layer 2 frame header, and transmit it to the control server for a processing, when the matching result of the flow table matching unit is "unmatched".

The encapsulating and transmitting unit may encapsulate the forwarded packet with the layer 2 frame header, and then directly transmit to the control server through the layer 2 network. Further, the encapsulating and transmitting unit may carry the identification of the network device in the forwarded packet. The encapsulating and transmitting unit may also carry PCI in the forwarded packet, wherein the PCI describes the basic attributes of the forwarded packet, such as the source of the forwarded packet (e.g., an uplink packet or a downlink loop-back packet), the type of the forwarded packet (e.g., an http-get packet or a UDP packet), the reporting mode of the forwarded packet (e.g., a duplicated packet, or a packet redirected to the control server), the physical port number of the network device, etc., so that the control server can acquire more information related to the forwarded packet after receiving the forwarded packet, thereby making more accurate judgment and processing to the forwarded packet.

The receiving unit is further configured to receive a flow table packet returned by the control server, wherein the flow table packet carries the flow table information of the forwarded packet and is encapsulated with a special layer 2 frame header. In which, the flow table information may be shown in Table 1, and the Ethernet type value in the special layer 2 frame header may instruct the processing unit to operate on the flow table packet.

The processing unit is configured to process the flow table packet according to the operation indicated by the Ethernet type value in the special layer 2 frame header of the flow table packet received by the receiving unit.

The processing unit may parse out information in the special layer 2 frame header of the flow table packet by performing a layer 2 packet parsing for the flow table packet, and process the flow table packet according to the operation indicated by the Ethernet type value in the special layer 2 frame header, e.g., directly looping back the flow table packet, transparent transferring the flow table packet, or generating a flow table according to the flow table packet.

The network device may be deployed at the access layer or the proximal end of the control server, and may be a router, switch or other network device having the function of flow table processing, herein is not limited.

To be noted, the network device herein may be the network device as described in the above method embodiments, and may be employed to implement all the technical solutions of the above method embodiments. The functions of respective functional modules of the network device 500 may be specifically achieved according to the methods in the above method embodiments. For the detailed processes, please refer to related descriptions of the above embodiments, and herein are not repeated.

Figure 7:
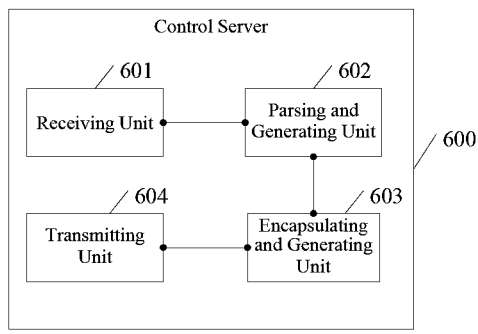
FIG. 7 is a structural diagram of a control server according to an embodiment of the present invention.

Next, a control server according to an embodiment of the present invention will be described. Referring to FIG. 7, a control server 600 according to an embodiment of the present invention includes: a receiving unit 601, a parsing and generating unit 602, an encapsulating and generating unit 603, and a transmitting unit 604.

The receiving unit 601 is configured to receive a forwarded packet from a network device.

The parsing and generating unit 602 is configured to parse the forwarded packet received by the receiving unit 601 to generate flow table information thereof.

In which, the flow table information may include the entries as shown in Table 1.

The encapsulating and generating unit 603 is configured to generate a flow table packet that carries the flow table information generated by the parsing and generating unit 602.

In order that the network device directly processes the flow table packet on the forwarding layer after receiving it, the encapsulating and generating unit 603 encapsulates a special layer 2 frame header in the flow table packet wherein an Ethernet type value in the special layer 2 frame header instructs the network device to process the flow table packet. In practical applications, the Ethernet type value in the special layer 2 frame header may be determined by the encapsulating and generating unit 603 according to the content of service data carried by the forwarded packet and an execution strategy that is locally preset and corresponding to the service. For example, assuming that the content of service data carried by the forwarded packet belongs to the Parental Control service, for which the control server 600 judges whether the forwarded packet accesses an illegal website (it may be determined according to the destination IP address in the forwarded packet) when receiving the forwarded packet. If yes, the encapsulating and generating unit 603 may construct an http packet that includes a legal website, encapsulate it into the flow table packet, and set the Ethernet type value in the special layer 2 frame header as a value that indicates an action of transparent transmission. After receiving the flow table packet, the network device transparent transfers the flow table packet to the user directly. If the forwarded packet accesses a legal website, the encapsulating and generating unit 603 may set the Ethernet type value in the special layer 2 frame header as a value that indicates an action of loop-back; after receiving the flow table packet, the network device loops back the flow table packet to the uplink query routing, so as to forward it to the destination website.

It will be appreciated that since the Ethernet type value in the special layer 2 frame header is a user-defined parameter value, the encapsulating and generating unit 603 needs to encapsulate the flow table packet with an ordinary layer 2 frame header after encapsulating it with a special layer 2 frame header, so as to ensure a normal transmission of the flow table packet in the layer 2 network.

Further, when one control server 600 manages a plurality of network devices, the encapsulating and generating unit 603 may carry the identification of the network device in the flow table packet (e.g., in the ordinary layer 2 frame header).

The transmitting unit 604 is configured to transmit the flow table packet generated by the encapsulating and generating unit 603 to the network device.

If the network device is directly connected to the control server via a layer 2 network, the transmitting unit 604 can directly return the flow table packet to the network device through the layer 2 network.

If the network device is deployed at the core network, the convergence network or the distal end of the control server, the transmitting unit 604 may send the flow table packet to the proximal network device (a network device having the forwarding function, such as the second network device) that forwards the flow table packet to the network device.

The control server 600 may be an SSP server.

It is clear that in the embodiment of the present invention, a special layer 2 frame header is encapsulate in the sent flow table packet by the control server, so that the network device can perform corresponding processing of the flow table packet directly on the data forwarding plane according to the operation indicated by the Ethernet type value in the special layer 2 frame header, while the network device and the control server complete the redirection of the forwarded packet and the sending of the flow table packet directly on the data forwarding plane. Therefore, the bottleneck of the network device control plane is not restrictive, and the separation of the data forwarding and the routing control is achieved.

To be noted, the control server herein may be the control server as described in the above method embodiments, and may be employed to implement all the technical solutions of the above method embodiments. The functions of respective functional modules of the control server may be achieved according to the methods in the above method embodiments. For the detailed processes, please refer to relevant descriptions of those embodiments, and herein are not repeated.

A person skilled in the art will clearly know that in order to achieve convenient and concise description, the specific working processes of the aforementioned system, device and units are not repeated herein, and please refer to corresponding processes in the above method embodiments for the details.

In the embodiments provided by the present application, it shall be appreciated that the disclosed system, device and method may be implemented in other ways. For example, the aforementioned device embodiments are just exemplary. For example, the division of the units is just a logical function division, and other division mode may be employed in practical implementation. For example, multiple units or components may be combined or integrated to another system, or some features may be omitted, or they are not executed. Another point is that the displayed or discussed mutual coupling, direct coupling or communication connection may be the indirect coupling or communication connection through some interfaces, devices or units, and may be in the form of electrical, mechanical, etc.

The units described as separate components may be or may not be physically separated. The parts displayed as units may be or may not be physical units, and may be located at the same place or deployed on multiple network units. Some or all of the units may be selected upon actual demand to implement the object of the solution of the embodiment.

In addition, various functional units in the respective embodiments of the present invention may be integrated into one processing unit, or existed as individual physical units, or two or more units may be integrated into one unit. The integrated unit may be implemented in the form of hardware or software functional unit.

In case being implemented in the form of software function unit and sold or used as an independent product, the integrated unit may be stored in a computer readable storage medium. Based on such understanding, the technical solutions of the present invention substantively, or a part thereof making a contribution to the prior art, or the whole or parts thereof, may be reflected in the form of software product stored in a storage medium, including several instructions to enable a computer device (e.g., personal computer, server, network facility, etc.) to execute all or a part of the steps of the methods of respective embodiments. The storage medium includes various mediums capable of storing program codes, such as U-disk, mobile hard disk, Read-Only Memory (ROM), Random Access Memory (RAM), magnetic disc, optical disc, etc.

A method for processing a packet and a related device provided by the present invention are described as above in detail. A person skilled in the art may change the embodiments and the application scope according to the idea of the embodiments of the present invention. In conclusion, the contents of the present specification shall not be construed as limitations to the present invention.

What is claimed is:

1. A method for processing a packet, comprising:
   receiving, by a first network device, a forwarded packet;
   performing, by the first network device, a flow table matching for the forwarded packet, and if unmatched:
   encapsulating, by the first network device, the forwarded packet with an inner encapsulation of a tunnel and an outer encapsulation of the tunnel;
   transmitting, by the first network device, the forwarded packet to a second network device, so that the second network device forwards the forwarded packet to a control server for processing;
   receiving, by the first network device, a flow table packet returned by the second network device, wherein the flow table packet carries flow table information of the forwarded packet, the flow table information is generated by the control server according to the forwarded packet a special layer 2 frame header is encapsulated in the flow table packet by the control server and an ordinary layer 2 frame header is encapsulated in the flow table packet by the control server after encapsulating the special layer 2 frame header in the flow table packet; and
   processing, by the first network device, the flow table packet carrying the flow table information on a data forwarding plane of the first network device according to an operation indicated by an Ethernet type value in the special layer 2 frame header, wherein the Ethernet type value in the special layer 2 frame header is a user-defined parameter value.

2. The method according to claim 1, wherein the inner encapsulation of the tunnel is a Multi-Protocol Label Switching (MPLS) label; and
   wherein the outer encapsulation of the tunnel is one of the group consisting of: an MPLS label, a Generic Routing Encapsulation (GRE) encapsulation, and an Internet Protocol Security Protocol (IPSec) encapsulation.

3. The method according to claim 1, wherein transmitting the forwarded packet to the second network device comprises:
   transmitting the forwarded packet to the second network device through a Pseudo Wire (PW) tunnel established between the first network device and the second network device.

4. The method according to claim 1, wherein processing the flow table packet comprises one of the group consisting of: directly looping back the flow table packet, transparently transferring the flow table packet, and performing a flow table sending for the flow table packet.

5. The method according to claim 1, wherein encapsulating the forwarded packet with the inner encapsulation of the tunnel and the outer encapsulation of the tunnel comprises carrying, in the forwarded packet, Packet Control Info (PCI) of the forwarded packet.

6. A method for processing a packet comprising:
   receiving, by a network device, a forwarded packet;
   performing, by the network device, a flow table matching for the forwarded packet, and if unmatched:
   encapsulating, by the network device, the forwarded packet with a layer 2 frame header;
   transmitting, by the network device, the forwarded packet to a control server for processing;
   receiving, by the network device, a flow table packet returned by the control server, wherein the flow table packet carries flow table information of the forwarded packet, the flow table information is generated by the control server according to the forwarded packet and a special layer 2 frame header is encapsulated in the flow table packet by the control server, and an ordinary layer 2 frame header is encapsulated in the flow table packet by the control server after encapsulating the special layer 2 frame header in the flow table packet; and
   processing, by the network device, the flow table packet carrying the flow table information on a data forwarding plane of the network device according to an operation indicated by an Ethernet type value in the special layer 2 frame header, wherein the Ethernet type value in the special layer 2 frame header is a user-defined parameter value.

7. The method according to claim 6, wherein processing the flow table packet comprises one of the group consisting of: directly looping back the flow table packet, transparently transferring the flow table packet, and generating a flow table according to the flow table packet.

8. The method according to claim 6, wherein, before transmitting the forwarded packet to the control server for processing, the method further comprises:
   carrying an identification of the network device in the forwarded packet.

9. A method for processing a packet, comprising:
   receiving, by a control server, a forwarded packet from a network device;
   parsing, by the control server, the forwarded packet to generate flow table information of the forwarded packet, wherein the flow table information is generated by the control server according to the forwarded packet;

generating, by the control server, a flow table packet that carries the flow table information, wherein a special layer 2 frame header is encapsulated in the flow table packet by the control server so that the network device processing the flow table packet processes on a data forwarding plane of the network device according to an operation indicated by an Ethernet type value in the special layer 2 frame header, and after the special layer 2 frame header being encapsulated in the flow table packet, an ordinary layer 2 frame header is encapsulated in the flow table packet, wherein the Ethernet type value in the special layer 2 frame header is a user-defined parameter value; and transmitting, by the control server, the flow table packet carrying the flow table information to the network device.

10. The method according to claim 9, wherein the forwarded packet carries an identification of the network device processing the flow table packet.

11. The method according to claim 9, wherein the flow table packet carries an identification of the network device processing the flow table packet.

12. A network device, comprising:
a receiving unit;
a flow table matching unit;
an encapsulating and transmitting unit; and
a processing unit;
wherein the receiving unit is configured to receive a forwarded packet,
wherein the flow table matching unit is configured to perform a flow table matching for the forwarded packet received by the receiving unit,
wherein the encapsulating and transmitting unit is configured to, when a matching result of the flow table matching is unmatched, encapsulate the forwarded packet with an inner encapsulation of a tunnel and an outer encapsulation of the tunnel, and transmit the forwarded packet to a second network device, so that the second network device forwards the forwarded packet to a control server for processing,
wherein the receiving unit is further configured to receive a flow table packet returned by the second network device, wherein the flow table packet carries flow table information of the forwarded packet, the flow table information is generated by the control server according to the forwarded packet a special layer 2 frame header is encapsulated in the flow table packet by the control server, and an ordinary layer 2 frame header is encapsulated in the flow table packet by the control server after encapsulating the special layer 2 frame header in the flow table packet, and
wherein the processing unit is configured to process the flow table packet carrying the flow table information on a data forwarding plane of the network device according to an operation indicated by an Ethernet type value in the special layer 2 frame header of the flow table packet, wherein the Ethernet type value in the special layer 2 frame header is a user-defined parameter value.

13. The network device according to claim 12, wherein the inner encapsulation of the tunnel is a Multi-Protocol Label Switching (MPLS) label; and
wherein the outer encapsulation of the tunnel is one of the group consisting of:
an MPLS label, a Generic Routing Encapsulation (GRE) encapsulation, and an Internet Protocol Security Protocol (IPSec) encapsulation.

14. The network device according to claim 12, wherein the encapsulating and transmitting unit is configured to transmit the forwarded packet encapsulated with the inner encapsulation of the tunnel and the outer encapsulation of the tunnel to the second network device through a Pseudo Wire (PW) tunnel established between the first network device and the second network device.

15. The network device according to claim 12, wherein the processing unit is configured to process the flow table packet by one of the group consisting of:
directly looping back the flow table packet, transparently transferring the flow table packet, and generating a flow table according to the flow table packet.

16. A network device, comprising:
a receiving unit;
a flow table matching unit;
an encapsulating and transmitting unit;
a processing unit;
wherein the receiving unit is configured to receive a forwarded packet,
wherein the flow table matching unit is configured to perform a flow table matching for the forwarded packet,
wherein the encapsulating and transmitting unit is configured to, when a matching result of the flow table matching is unmatched, encapsulate the forwarded packet with a layer 2 frame header and to transmit the forwarded packet to a control server for a processing,
wherein the receiving unit is further configured to receive a flow table packet returned by the control server, wherein the flow table packet carries flow table information of the forwarded packet, the flow table information is generated by the control server according to the forwarded packet and a special layer 2 frame header is encapsulated in the flow table packet by the control server, and an ordinary layer 2 frame header is encapsulated in the flow table packet by the control server after encapsulating the special layer 2 frame header in the flow table packet, and
wherein the processing unit is configured to process the flow table packet carrying the flow table information on a data forwarding plane of the network device according to an operation indicated by an Ethernet type value in the special layer 2 frame header of the flow table packet, wherein the Ethernet type value in the special layer 2 frame header is a user-defined parameter value.

17. The network device according to claim 16, wherein the processing unit is configured to process the flow table packet by one of the group consisting of:
directly looping back the flow table packet, transparently transferring the flow table packet, and generating a flow table according to the flow table packet.

18. A control server, comprising:
a receiving unit;
a parsing and generating unit;
an encapsulating and generating unit; and
a transmitting unit;
wherein the receiving unit is configured to receive a forwarded packet from a network device,
wherein the parsing and generating unit is configured to parse the forwarded packet received by the receiving unit to generate flow table information of the forwarded packet,
wherein the encapsulating and generating unit is configured to generate a flow table packet that carries the flow table information, wherein the flow table information is generated by the control server according to the forwarded packet and a special layer 2 frame header is encapsulated in the flow table packet by the control server, so that the network device processing the flow table packet processes the flow table packet carrying the flow table information on a data forwarding plane of the network device according to an operation indicated by an Ethernet type value in the special layer 2 frame header, and after the special layer 2 frame header being encapsulated in the flow table packet, an ordinary layer 2 frame header is encapsulated in the flow table packet, wherein the Ethernet type value in the special layer 2 frame header is a user-defined parameter value, and wherein the transmitting unit is configured to transmit the flow table packet generated by the encapsulating and generating unit to the network device.

19. The control server according to claim 18, wherein, the forwarded packet received by the receiving unit carries an identification of the network device processing the flow table packet; and the encapsulating and generating unit is further configured to carry the identification of the network device processing the flow table packet in the flow table packet.

* * * * *